(12) United States Patent
Gould

(10) Patent No.: US 10,814,800 B1
(45) Date of Patent: Oct. 27, 2020

(54) VEHICLE IMAGING STATION

(71) Applicant: Degould Limited, Exeter (GB)

(72) Inventor: Daniel George Gould, Exeter (GB)

(73) Assignee: Degould Limited, Exeter (GB)

( * ) Notice: Subject to any disclaimer, the term of this patent is extended or adjusted under 35 U.S.C. 154(b) by 0 days.

(21) Appl. No.: 16/705,685

(22) Filed: Dec. 6, 2019

(51) Int. Cl.
*H04N 7/18* (2006.01)
*B60R 11/04* (2006.01)
*B60R 25/10* (2013.01)

(52) U.S. Cl.
CPC .......... *B60R 11/04* (2013.01); *B60R 25/1004* (2013.01); *H04N 7/181* (2013.01); *B60R 2300/30* (2013.01)

(58) Field of Classification Search
CPC ............... H04N 7/185; H04N 5/23203; H04N 5/23206; H04N 5/23241; H04N 5/23245
See application file for complete search history.

(56) References Cited

U.S. PATENT DOCUMENTS

| 2017/0293894 | A1* | 10/2017 | Taliwal | ..................... G06T 7/11 |
| 2018/0012350 | A1* | 1/2018 | Gangitano | ............ H04N 7/188 |
| 2018/0160019 | A1 | 6/2018 | Scheich | |
| 2019/0095877 | A1 | 3/2019 | Li | |

OTHER PUBLICATIONS

Extended European Search Report issued in European Application No. 19214041.6 dated Jun. 12, 2020.

* cited by examiner

*Primary Examiner* — Samira Monshi
(74) *Attorney, Agent, or Firm* — Womble Bond Dickinson (US) LLP; John J. Penny, Jr.

(57) ABSTRACT

A vehicle damage detection system comprising: a booth having a booth entrance for a vehicle to enter the booth and a booth exit for the vehicle to exit the booth; a plurality of damage assessment cameras orientated to capture damage assessment images of the vehicle when the vehicle is located at a damage assessment zone within the booth; a data processor configured to: receive the damage assessment images; execute a program to identify and assess damage to the vehicle using the damage assessment images; and generate a damage report quantifying the damage to the vehicle.

15 Claims, 9 Drawing Sheets

VEHICLE IMAGING STATION

BACKGROUND

It is known for a vehicle to pass from one user to another. In one example, it is known for a vehicle to be hired out to a user on a temporary basis, the vehicle having been used by one or more earlier users.

The present inventor has devised a system that can reduce the likelihood of a dangerous vehicle being used.

SUMMARY

In accordance with a first aspect of the present invention, there is provided a vehicle damage detection system comprising:
- a booth having a booth entrance for a vehicle to enter the booth and a booth exit for the vehicle to exit the booth;
- a plurality of damage assessment cameras orientated to capture damage assessment images of the vehicle when the vehicle is located at a damage assessment zone within the booth;
- a data processor configured to:
  - receive the damage assessment images;
  - execute a program to identify and assess damage to the vehicle using the damage assessment images; and
  - generate a damage report quantifying the damage to the vehicle.

Thus, the vehicle safety alarm system according to the first aspect uses an algorithm to identify damage such as dents and scratches in images of a vehicle to automatically generate an output that quantifies the damage to the vehicle. If for example a vehicle such as a rental car has been involved in an accident which has not been reported, the vehicle safety alarm system according to the first aspect can quickly and accurately determine the level of risk and use the output to inform an intended user before they use the damaged vehicle.

The system can be configured to transmit the damage report to the user, in some embodiment only if the quantified damage exceeds a threshold.

The one or more damage assessment cameras can comprise:
- a first field of view in which a structured light image will be reflected from a structured light source located within the booth to be visible to at least one of the one or more damage assessment cameras by a vehicle moving along a vehicle pathway, such that the first field of view can enable detection of dents on the vehicle; and
- a second field of view in which a non-structured light image will be reflected to be visible to the single camera when a vehicle moves along the vehicle pathway, the non-structured light image comprising a reflection of part of the booth that is distinct from the structured light source such that the second field of view can enable detection of scratches on the vehicle.

The damage assessment zone can comprise:
- a tunnel portion of the booth having a tunnel entrance and a tunnel exit with one or more walls defining an enclosure between the tunnel entrance and tunnel exit to define a tunnel volume containing the vehicle pathway having a central axis;
- a structured light source arranged to direct structured light at the vehicle pathway for illuminating a vehicle on the pathway with a structured light image;
- a first damage assessment camera arranged with a field of view comprising, containing and/or encompassing a structured light portion of the tunnel volume in which the structured light image will be reflected to be visible to the first camera by a vehicle moving along the vehicle pathway;
- a second damage assessment camera arranged with a field of view comprising, containing and/or encompassing a non-structured light portion of the tunnel volume in which the structured light image will not be reflected to be visible to a second camera when a vehicle moves along the vehicle pathway; and
- a non-reflective, non-illuminating surface within the tunnel on a same side of the central axis of the vehicle pathway as the second camera.

Alternatively, rather than providing distinct first and second damage assessment cameras, a single camera can be provided for viewing a portion of a vehicle, the single camera being arranged with:
- a first field of view region comprising, containing and/or encompassing a structured light portion of the tunnel volume in which the structured light image will be reflected to be visible to the single camera by a vehicle moving along the vehicle pathway;
- a second field of view region comprising, containing and/or encompassing a non-structured light portion of the tunnel volume in which the structured light image will not be reflected to be visible to the single camera when a vehicle moves along the vehicle pathway; and
- a non-reflective, non-illuminating surface within the tunnel on a same side of the central axis of the vehicle pathway as the camera Multiple such cameras can be provided to enable multiple distinct portions of the vehicle to be imaged.

The tunnel entrance can define the booth entrance.

The second damage assessment camera can be orientated such that the structured light portion of the tunnel volume is not visible anywhere within the field of view of the second camera.

The first and second damage assessment cameras can be arranged such that the field of view of the second camera does not overlap with the field of view of the first camera.

The first and second damage assessment cameras can be mounted between the non-reflective, non-illuminating surface and the structured light source.

The first damage assessment camera can be angled away from the second damage assessment camera, such that its field of view points away from the second camera.

The non-reflective, non-illuminating surface can be a plain surface for example a substantially non-patterned surface. This can provide a blank reflection image to the second camera in which scratches on the vehicle are easily observable.

The non-reflective, non-illuminating surface can be planar or flat.

The first and second damage assessment cameras can define a first camera pair, arranged together to enable scratch and dent detection of a region of a vehicle, such as the top, a side, a portion thereof for example. One or more of the camera pairs can comprise further cameras of one type such that a camera pair has, say, two scratch cameras and one dent camera in close proximity, viewing a common area of the vehicle as it moves through the damage assessment zone, optionally with each scratch camera focusing on different parts of the vehicle within the field of view of the dent camera.

The damage assessment zone can comprise one or more further camera pairs, at least one of which can be mounted on the opposite side of the central axis of the vehicle pathway in comparison to the first pair and/or one of which can be mounted on a roof surface of the tunnel facing the vehicle pathway in order to capture images of the roof. A series of more than five camera pairs can be mounted in a series around the tunnel. In one example, six dent cameras and twelve scratch cameras can be provided, in six pairs of two scratch cameras and one dent camera.

The damage assessment zone can comprise one or more further light sources, which in some embodiment may not directly visible to the first or second cameras in reflection via the vehicle. Such a light source can help to further illuminate the vehicle without affecting the ability to observe dents or scratches.

The side walls and roof can be generally planar or flat, with the roof extending orthogonally to the side walls to create a rectangular cross section tunnel. Alternatively, the tunnel can have an arc shaped or otherwise curved cross section.

The ends of the side wall(s) can define the opening and exit i.e. the opening and exit can have roughly the same cross sectional area as other portions of the tunnel.

The entrance can be distinct from the exit, resulting in a linear vehicle pathway between the entrance and exit. The entrance and exit can be aligned. The linear pathway can be a straight line for ease of passage.

The damage assessment zone can comprise one or more, further damage assessment cameras arranged to capture images of the front and/or rear of the vehicle, the underbody and/or the wheels or tyres. This can enable the condition of wheels, tyres and the underbody to be recorded.

A tyre depth system can be provided within the damage assessment zone.

The system can comprise one or more appearance assessment cameras orientated to capture appearance images of the vehicle when the vehicle is located at an appearance assessment zone within the booth.

Thus, in addition to imaging the vehicle for the purpose assessing damage, the booth can be used to image the appearance of the vehicle. This can provide an accurate way associating a damaged vehicle with its appearance, which can increase the likelihood of obtaining a one or more reference images of a true appearance state of the vehicle, thereby increasing the likelihood of the vehicle being correctly identified, either manually or automatically, to inhibit use of the vehicle.

The appearance assessment zone can comprise a housing portion of the booth that has a larger volume than the tunnel portion. This can provide an arrangement in which the damage assessment cameras are close to the vehicle while providing space for the appearance assessment cameras to accurately image the appearance of the vehicle.

One end of the tunnel portion can open into the housing portion. Thus, the exit for the tunnel portion can serve as the entrance to the housing portion.

The appearance assessment zone can comprise a turntable sized to receive the vehicle and a motor unit configured to cause relative rotation between the turntable and a distinct portion of the appearance assessment zone and at least one of the appearance assessment cameras is mounted to face the rotational axis of the turntable. This can enable the vehicle to be rotated relative to the camera, by the motor rotating one of the turntable and the distinct portion of the appearance assessment zone relative to the other for 360 degree imaging of the vehicle. This arrangement can also enable the tunnel portion to serve as the entrance and the exit for the housing portion.

The housing portion can comprise a plurality of appearance assessment cameras disposed in an equiangular arrangement around a camera axis located within the housing portion.

The housing portion can include an exit distinct from the tunnel portion defining the booth exit.

The data processor can comprise a general purpose computer, application specific integrated circuit or the like, arranged to receive inputs from the cameras and store them in computer memory and/or transmit them to a remote device.

The system can comprise a vehicle identification sensor such as an ANPR Camera positioned to capture vehicle data enabling the vehicle to be identified as it approaches the booth entrance.

The system can comprise a plurality of appearance assessment cameras located within the tunnel portion and positioned to capture images of the wheels of the vehicle. The inventor has found that this can result in more accurate and/or uniform images of the wheels being achievable in comparison to cameras located in the housing portion, when the tunnel portion is narrower than the housing portion, due to there being less room for user error in positioning the vehicle for imaging.

The imaging station can comprise one or more, further sensors coupled to the data processor. The imaging station can for example comprise: a sound transducer such as a microphone arranged to detect engine noise; a proximity sensor arranged to detect a vehicle approaching the opening; and/or a vehicle speed sensor that the controller can use to synchronise cameras for stitching images together to form a continuous image of some or all of the vehicle or for adjusting camera settings such as shutter speed.

In any embodiment, the booth can be omitted. In such embodiments, the system can be operated in an enclosure that is distinct from the system, or at times when ambient light is less problematics such as at night time.

In accordance with a second aspect of the invention, there is provided a computer controlled method of imaging a vehicle, the method comprising:
    identifying a vehicle;
    capturing damage assessment images of the vehicle;
    at a computing device, processing the damage assessment images to produce a damage report; and
    transmitting the damage report to a user.

The method can comprise only transmitting the damage report to the user if the quantified damage exceeds a threshold. The threshold can for example be detection of a dent which is more than a predetermined depth, such as 5 cm, which may indicate the presence of damage to an underlying component. In another example, the threshold can comprise identification of a linear scratch that extends more than a predetermined length, such as 10 cm, which may indicate that a vehicle has been significantly damaged and repaired by welding a portion of one vehicle to a portion of another vehicle. In another example, the threshold can comprise identification of any damage on the vehicle.

If no damage is detected, the damage report can be sent regardless, informing the user that no damage has been detected.

The method can comprise:
    capturing appearance images of the vehicle;
    at a computing device, processing the appearance images to produce an appearance assessment report; and transmitting the appearance assessment report to one or more entities distinct from the user.

The damage report can comprise a first offer to purchase the vehicle for a first value from a first entity.

The method can comprise transmitting the appearance report to a second entity in response to receiving a decline signal from the user with respect to the first offer.

The method can comprise, in response to receiving a second offer to purchase the vehicle for a second value from a second entity, transmitting the second offer to the user.

The method can comprise modifying and transmitting the appearance report to a third entity in response to receiving a decline signal from the user with respect to the second offer.

The method can comprise, in response to receiving a third offer to purchase the vehicle for a third value from a third entity, transmitting the third offer to the user.

BRIEF DESCRIPTION OF THE DRAWINGS

By way of example only, certain embodiments of the invention will now be described by reference to the accompanying drawings, in which.

DETAILED DESCRIPTION

Figure 1:
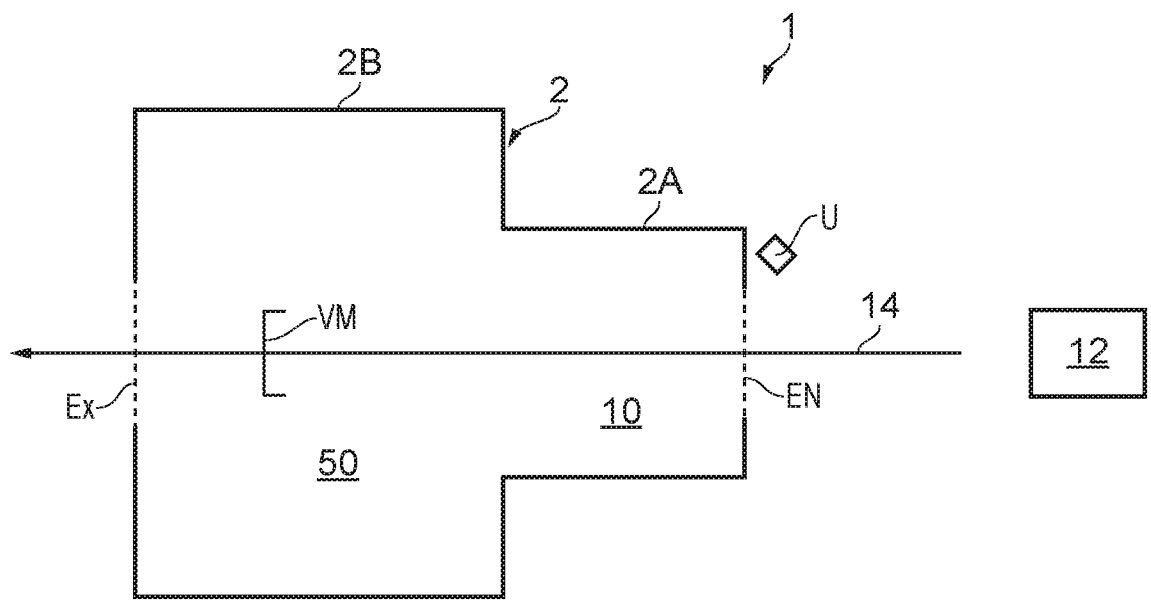
FIG. 1 is a diagram showing a plan view of a vehicle imaging station according to an embodiment of the invention.

FIG. 1 shows a vehicle imaging station according to an embodiment of the invention generally at 1.

The vehicle imaging station 1 has two distinct zones: a damage assessment zone 10 and an appearance assessment zone 50. The two zones will be described in more detail below, but as a general overview the damage assessment zone 10 is arranged and configured to enable images of a vehicle 12 to be captured and fed into a computing controller for the controller to automatically determine a level of damage to the vehicle 12. The appearance assessment zone 50 is arranged and configured to enable high quality images of the appearance of vehicle 12 to be captured for identification purposes for example.

In the illustrated embodiment the damage assessment zone 10 and the appearance assessment zone 50 are confined within a booth 2 that inhibits ambient light external to the booth 2 entering the booth 2 during imaging of the vehicle 12. The booth 2 has a tunnel portion 2A which forms part of the damage assessment zone 10 and a relatively large housing portion 2B which forms part of the appearance assessment zone 50. The booth 2 has an entrance EN via which the vehicle 12 can enter the tunnel portion 2A. The booth also has an exit EX via which the vehicle can exit the housing portion 2B. The vehicle can pass from the entrance EN to the exit EX through the booth 2 by driving along a vehicle pathway 14.

The system 1 can be used by anyone with an appropriately sized vehicle. In one example, the damage assessment zone 10 can be at least 3 m long and 2 m wide, preferably between 3 m and 8 m long and between 3 m and 5 m wide, and the appearance assessment zone 50 can be at least 3 m long and 2 m wide, preferably between 6 m and 10 m long and between 6 m and 10 m wide.

Figure 2:
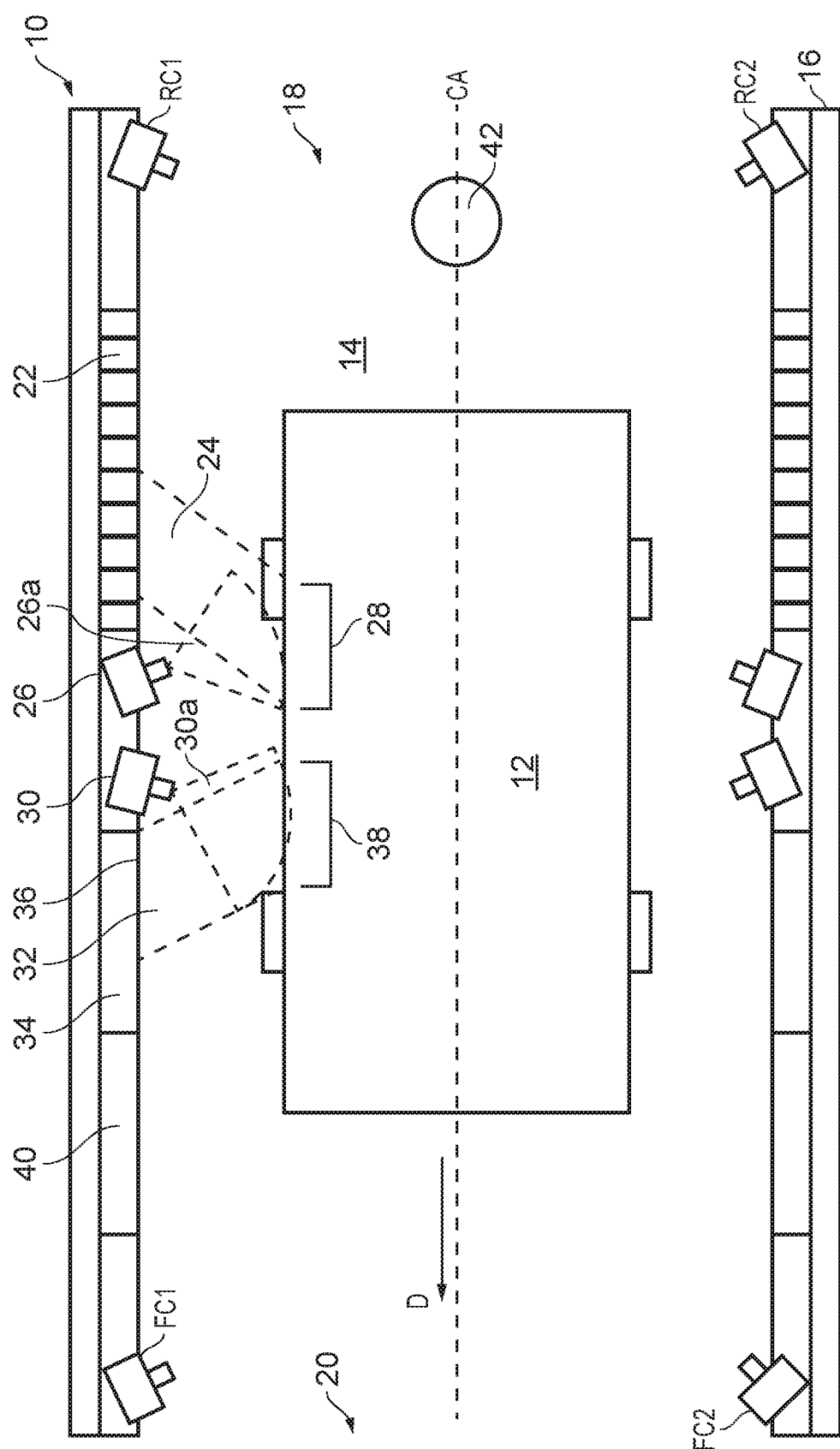
FIG. 2 is a diagram showing a plan view of the damage assessment zone of the vehicle imaging station of FIG. 1.

Referring to FIG. 2, the damage assessment zone 10 is described in more detail. The damage assessment zone 10 is arranged to take images of the vehicle 12 that can be used to identify damage in the form of scratches and dents on outer panels or other surfaces of the vehicle.

The damage assessment zone 10 is arranged around the vehicle pathway 14, which can be any path suitable for the vehicle 12 to travel along in a direction D. The pathway 14 is a straight, linear pathway in the illustrated embodiment, but in other embodiments can take any form.

Figure 3A:
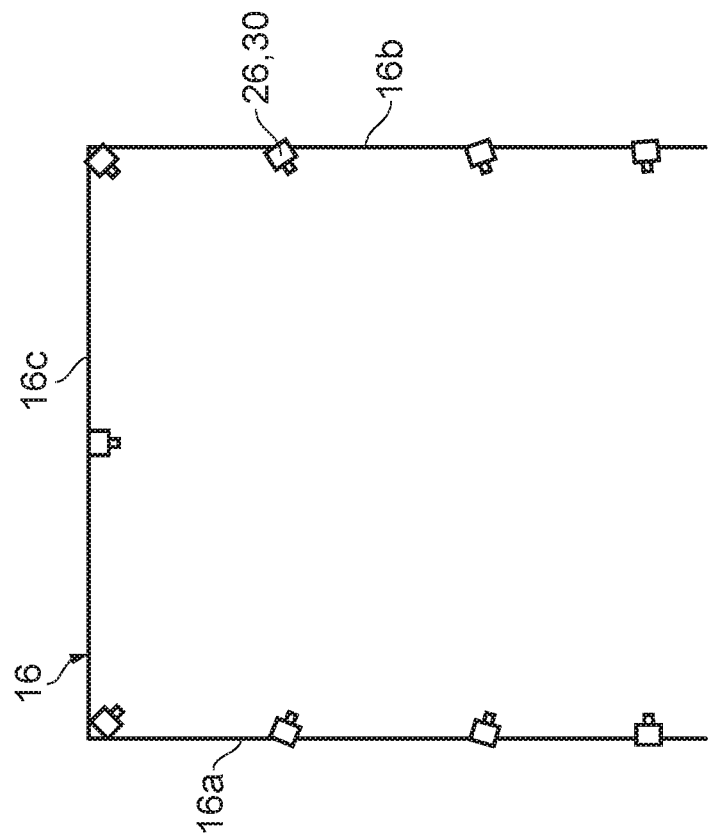
FIG. 3A is a diagram showing a possible tunnel cross section of the damage assessment zone of the vehicle imaging station of FIG. 1.

Referring additionally to FIG. 3A, the tunnel 2A is arranged so that the vehicle pathway 14 runs through it. In this embodiment the tunnel 2A has two generally planar side wall sections 16a, 16b that are joined at the top by an orthogonally extending, generally planar roof 16c to form a single structure. However, in other embodiments the tunnel 2A can have any suitable cross sectional shape, such as the arch shown in FIG. 3B to which reference should additionally be made.

The tunnel 2A has an entrance 18 and an exit 20 via which the vehicle can enter and exit the tunnel 2A. In this embodiment the entrance 18 defines the booth entrance EN and the exit 20 opens into the housing 2B of the booth 2. The entrance 18 and exit 20 are situated at opposite end of the tunnel 2A to define a linear vehicle pathway having a central axis CA. However, in other embodiments the tunnel can have any suitable shape and can have any number of entrances and/or exits, in some cases just a single opening that serves as both an entrance and an exit.

The inventor has recognised that it can be difficult to perceive both vehicle bodywork dents and scratches under the same lighting conditions. The inventor has devised an arrangement that enables both scratches and dents to be imaged in a single stage process, in some cases using a single light source, thus providing an imaging station occupying a relatively small mechanical footprint that can be used to quickly and accurately record damage to a vehicle.

The tunnel 2A includes a structured light source 22 arranged to direct structured light 24 at the vehicle pathway 14 for illuminating the vehicle 12 on the pathway 14 with a structured light image (not shown). In this embodiment the structured light source 22 extends up one side wall 16a from the vehicle pathway 14, across the roof section 16c and down the opposite side wall 16b, back to the vehicle pathway 14 to form an arch of structured lighting. This arrangement enables the structured light image to be projected onto both sides, and the roof, of the vehicle 12 as it passes the structured light source 22. The structured light source 22 is a light array having a set of LED strips arranged in parallel. The LED strips extend along each light array, from the bottom to the top and across the roof section. LEDs can for example comprise ultra-bright cool white LED tape, with a luminosity of 2880 lumens per meter. In one example a set of twenty LED strips can be arranged into 14.25 mm wide grooves spaced 15.75 mm apart and set 9 mm deep with a 10 mm backing behind them. Semi opaque diffusers (not shown) can be provided over each strip of LEDs to create a flat light from each strip of tape.

In other embodiment the structured light source 22 can have any suitable configuration arranged to project the structured light image onto one or more surfaces and in some cases all outer surfaces of the vehicle; for example, each light source can include a laser projector configured to project one or more light patterns.

The damage assessment zone 10 includes damage assessment cameras of a first type 26, namely high speed 'dent detecting' cameras arranged to image dents on the vehicle.

Figure 3B:
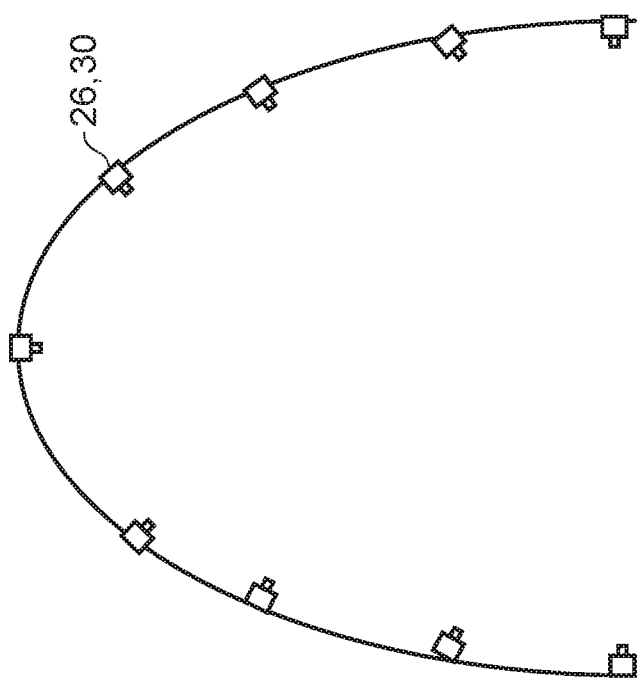
FIG. 3B is a diagram showing a possible tunnel cross section of the damage assessment zone of the vehicle imaging station of FIG. 1

Multiple dent cameras 26 can be arranged inside the tunnel 2A, located on the side walls 16a, 16b and roof 16c to form an arch, as shown in FIG. 3B, so that the sides and roof of the vehicle 12 can be simultaneously imaged.

Each dent detecting camera 26 is arranged with a field of view 26a comprising a structured light portion of the tunnel volume in which the structured light image will be reflected to be visible to the first camera 26 by a vehicle 12 moving along the vehicle pathway 14. Thus, the dent detecting cameras 26 are located in the tunnel 2A so that the dent camera field of view 26a overlaps with the striped pattern reflecting on the vehicle. The system can be calibrated for an average or expected vehicle profile for example.

Should the vehicle 12 have a dent in the bodywork, the striped reflections will distort around the dent, for example creating a circle like shape in the reflection. The images captured by the dent detection cameras 26 can then be used retrospectively to analyse whether a vehicle 12 has dents at a certain point in time. Thus, the field of view 26a of the dent detecting cameras 26 overlap the reflected striped image area 28 on the vehicle 12.

The structured light source can be in the form of panels mounted on the tunnel side walls and/or roof, either freestanding or mounted separately to the tunnel wall.

In addition to dent detecting cameras 26, the tunnel 2A includes damage assessment cameras of a second type 30, namely scratch detecting cameras.

Multiple scratch detecting cameras 30 can be arranged inside the tunnel 2A, located on the side walls 16a, 16b and roof 16c to form an arch, as shown in FIG. 3B, so that the sides and roof of the vehicle 12 can be simultaneously imaged.

Each scratch detecting camera 30 is arranged with a field of view 30a which includes a non-structured light portion 32 of the tunnel volume in which the structured light image will not be reflected to be visible to the second camera 30 when a vehicle 12 moves along the vehicle pathway 14. Thus, the field of view of the scratch detecting cameras 30 include at least a portion that does not overlap the reflected striped image area 28 on the vehicle 12. It is preferred that the entire field of view 30a of the scratch detecting cameras 30 does not at all overlap the reflected striped image area 28 on the vehicle 12, as this can increase the amount of vehicle bodywork upon which scratches can be detected.

The dent and scratch cameras 26, 30 can be arranged to form camera pairs, which sequentially observe the same portion of the vehicle 12 as it moves along the pathway 14. The damage assessment zone 10 can therefore include multiple pairs of cameras at several locations around the tunnel 2A. Preferably, at least one of the further camera pair is located on the opposite side of the central axis CA in comparison to the first pair and/or located on the roof surface 16c of the tunnel 2A facing the vehicle pathway 14. The field of view 30a of the scratch detecting camera 30 does not overlap with the field of view 26a of the dent detecting camera 26.

A non-structured light source 34 can be provided to assist the scratch cameras 30 to image scratches on the vehicle 12. The inventor has recognised that instead of providing a distinct light source for each type of camera, the striped lighting 24 reflected from the vehicle 12 can be scattered by a plain, non-reflective, non-illuminating surface 36 within the tunnel on a same side of the central axis CA of the vehicle pathway 14 as the second camera 30. For example, the non-reflective, non-illuminating surface 36 can be a non-patterned, matte, white surface.

The non-reflective, non-illuminating surface 36 can form an arch in the tunnel 2A, extending from the vehicle pathway 14, towards the roof 16c of the tunnel 2A, across the roof 16c of the tunnel 2A and down to the vehicle pathway 14 on the opposite side wall 16a, 16b.

The striped lighting 24 can reflect onto the non-reflective, non-illuminating surface 36 which can scatter the structured light to direct scattered, non-structured light back onto the vehicle 12. This can provide a non-structured lighting area 38 on the vehicle 12 which illuminates the vehicle 12 so that the scratch detecting cameras 30 can accurately image scratches.

The scratch cameras 30 are angled such that the non-reflective, non-illuminating surface 36 is directly visible in reflection via the vehicle 12, which can improve the ability of the scratch cameras 30 to detect scratches. The angle can for example be between 22 degrees and 45 degrees.

In the illustrated embodiment, the camera pairs are located between the non-reflective, non-illuminating surface 36 and the source 22 of structured light 24 and directed away from one another. However, in other embodiments any suitable arrangement can be provided.

An optional general light source 40 can be provided, such as a light box, in order to provide a general light source for the tunnel 2A. Increasing the amount of light within the tunnel 2A is advantageous as it can reduce noise on the cameras, meaning that the cameras can be fired at a faster rate. A plurality of general light sources can be provided within the tunnel to illuminate various sides of the vehicle. However, any general light sources should not be directly visible in the field of view 26a, 30a of the scratch detecting cameras and dent detecting cameras when a vehicle is being imaged, particularly for the scratch detecting cameras 30.

Rear cameras RC1, RC2 can be provided at the entrance 18 of the tunnel and front cameras FC1, FC2 can be provided at the exit 20 of the tunnel 2A such that these cameras can capture images of the vehicle 12 as it enters and exits the tunnel volume.

The vehicle imaging station 1 can comprise a vehicle identification sensor such as an automatic number plate recognition (ANPR) Camera U positioned to capture vehicle data enabling the vehicle 12 to be identified as it approaches the booth entrance.

A tyre depth system can be provided within the damage assessment zone 10. For example, a laser based measurement system, time of flight (TOF) camera, or a pressure pad.

Figure 4A:
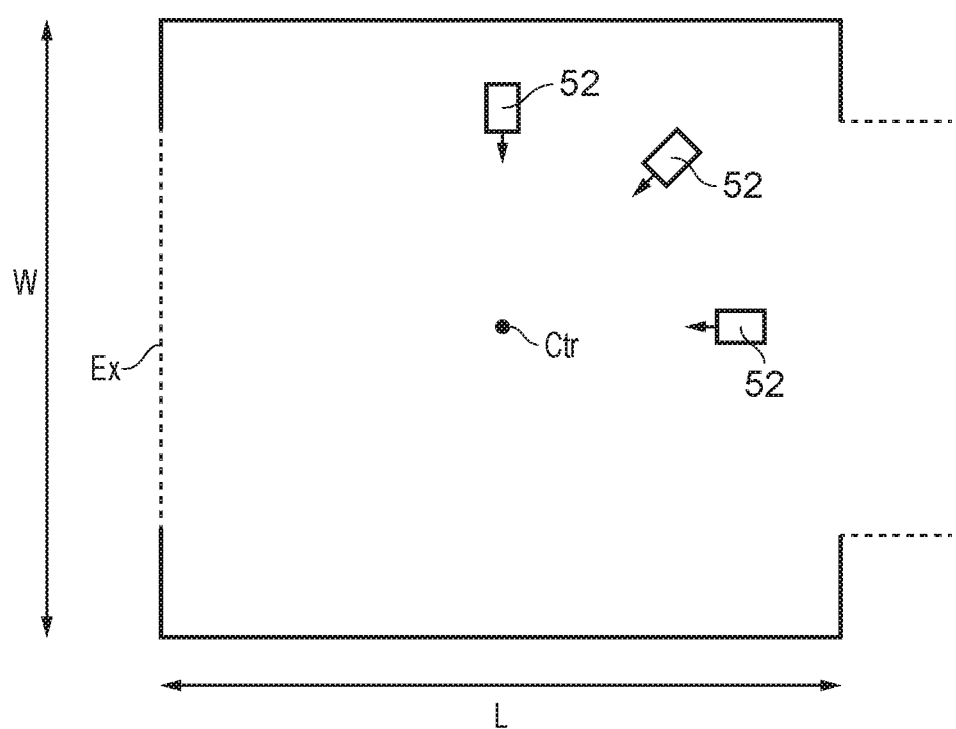
FIG. 4A is a diagram showing a possible plan view of the appearance assessment zone of the vehicle imaging station of FIG. 1.

Referring additionally to FIG. 4A, the appearance assessment zone 50 is described in more detail.

The housing portion 2B of the booth 2 has a relatively large cross sectional area defined by its length L and width W, relative to the tunnel portion 2A. This provides space for cameras to be arranged to take high-quality images of the vehicle through 360 degrees.

A plurality of appearance assessment cameras 52 are mounted in or on the housing portion 2B and orientated to capture appearance images of the vehicle 12. The appearance assessment cameras 52 can be oriented to focus on a vehicle target location such as the centre Ctr of the housing portion 2B.

In the illustrated embodiment the centre Ctr defines a camera axis Ctr. The plurality of appearance assessment cameras 52 are disposed in an equiangular arrangement around the camera axis Ctr to enable 360 degree imaging of the vehicle 12. For clarity, only three cameras 52 are shown, but the cameras 52 extend 360 degrees around the centre Ctr.

Figure 4B:
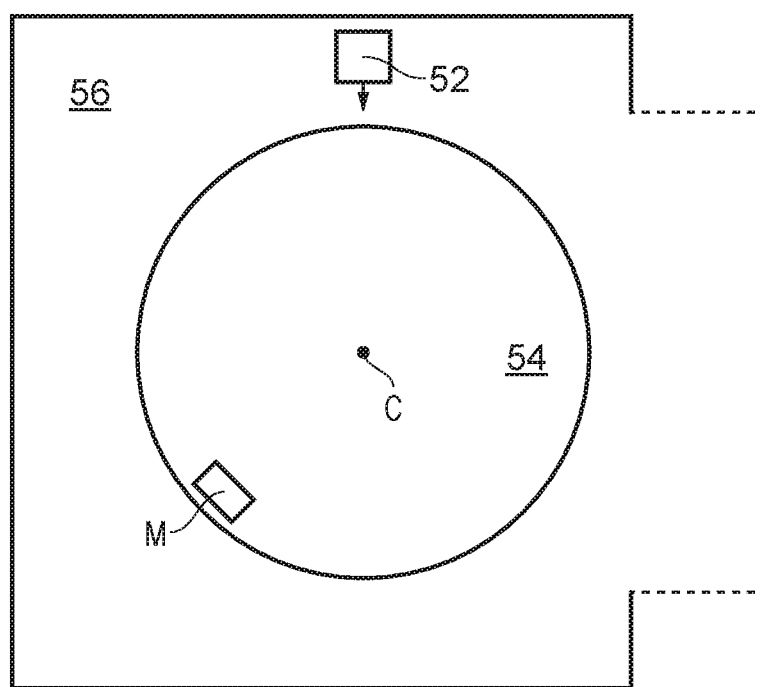
FIG. 4B is a diagram showing a possible plan view of the appearance assessment zone of the vehicle imaging station of FIG. 1.

However, in other embodiments, such as the embodiment of FIG. 4B, reference to which should now additionally be made, the appearance assessment zone 50 can comprise a turntable 54 sized to receive the vehicle 12 and a motor unit M configured to cause relative rotation between the turntable 54 and a distinct portion 56 of the appearance assessment zone, such as the floor around the turntable 54. Embodiments provided with a turn table 54 can include at least one appearance assessment camera 52 is mounted to face the rotational axis C of the turntable, which in this embodiment is the centre of the housing portion 2B but this need not be the case. The turntable 54 can enable the vehicle 12 to be rotated relative to the camera 52, by the motor M rotating the turntable for 360 degree imaging of the vehicle 12. This arrangement can also enable the tunnel portion to serve as the entrance and the exit for the housing portion. Alternatively, the camera 52 can be mounted on a ring shaped floor portion surrounding a stationary circular centre upon which the vehicle 12 can be parked and a motor provided to rotate the ring portion and camera about the stationary circular centre; in such embodiments, a dedicated exit can be provided such as exit EX shown in FIG. 4A.

One or more visual markers VM can be provided to indicate to a user where to park the vehicle 12 as it enters the housing portion 2A. The visual markers VM can comprise one or more of lines or the like provided on the floor, one or more speed bumps and/or graphical instructions on display screen mounted to be visible from within the booth.

The system 1 can comprise a plurality of appearance assessment cameras located within the tunnel portion 2A and positioned to capture images of the wheels of the vehicle, such as front cameras FC1, FC2. The inventor has found that this can result in more accurate and/or uniform images of the wheels being achievable in comparison to cameras located in the housing portion 2B, when the tunnel portion is narrower than the housing portion, due to there being less room for user error in positioning the vehicle for imaging.

Figure 5:
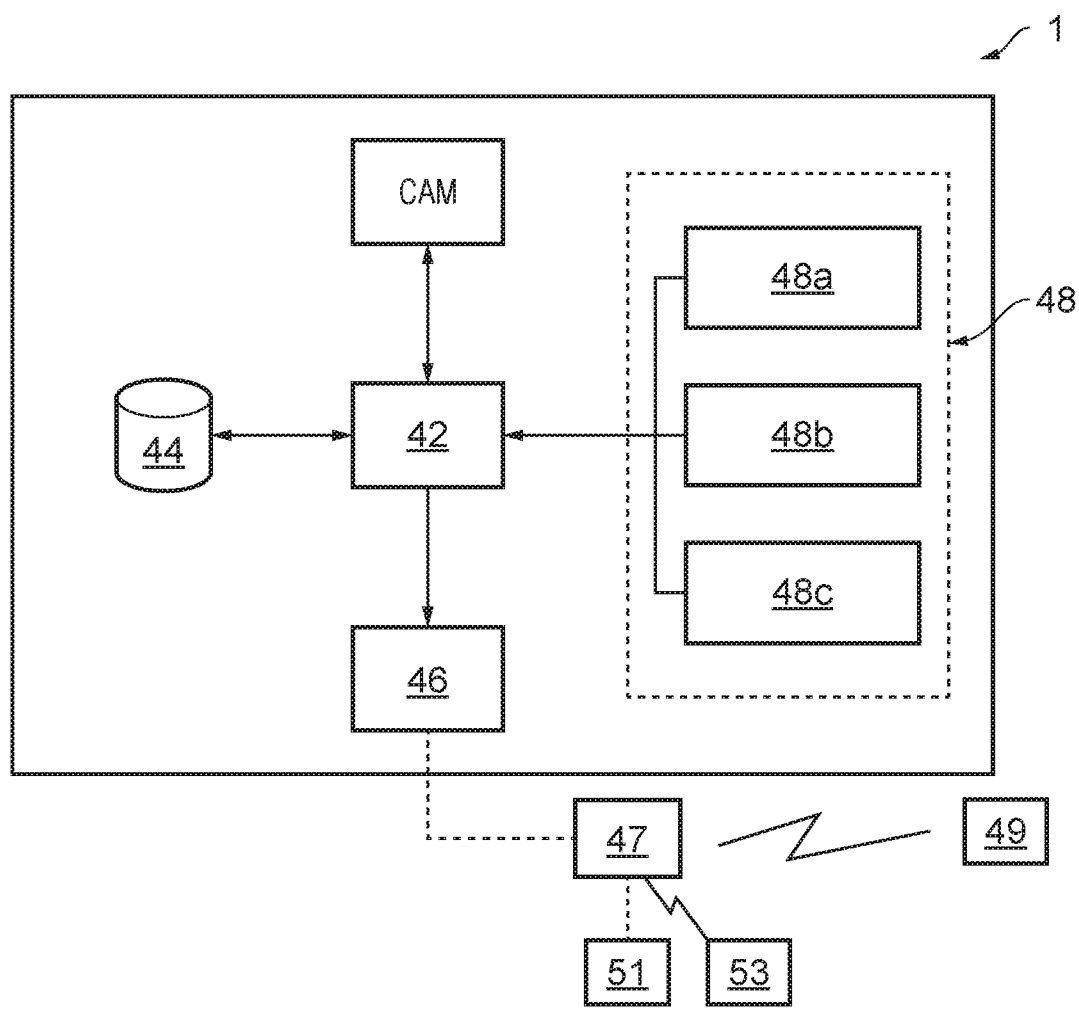
FIG. 5 is a diagram of a controller for the vehicle imaging station of FIG. 1.

Referring additionally to FIG. 5, the imaging station 1 includes a data processor 42 such as a general purpose computer, application specific integrated circuit or the like, arranged to receive images from the cameras. The data processor 42 can comprise a single device or can be a distributed system.

The data processor 42 is coupled to some or all of cameras CAM (26, 30, FC1, FC2, RC1, RC2, U, 52) to provide trigger signals to the cameras and receive captured images from the cameras CAM.

The data processor 42 is coupled to a computer memory 44 arranged to store executable programs. The data processor can also store images or other data on the computer memory.

The data processor 42 is coupled to a network interface 46 such as a wired or wireless internet connection to enable the data processor 42 to send data to and receive data from a remote computing device or server 47.

The remote computing device or server 47 can in turn be arranged to wirelessly communicate with a user device 49 and/or communicate with one or more further entities 51, 53.

The imaging station 1 can also be provided with one or more vehicle position sensors 48 coupled to the data processor 42. The imaging station 1 can for example comprise one or more of: a sound transducer 48a such as a microphone arranged to detect engine noise; a proximity sensor 48b arranged to detect a vehicle approaching and/or arriving at a specific location; and/or a vehicle speed sensor 48c that the data processor 42 can use to synchronise cameras for stitching images together to form a continuous image of some or all of the vehicle or for adjusting camera settings such as shutter speed. Thus, the vehicle position sensors 48 serve as inputs to the data processor 42 for firing the cameras based on the position of the vehicle 12.

In any embodiment the cameras, including the dent cameras, scratch cameras and appearance assessment cameras, can comprise area scan cameras such as one or more Hikvision™ MV-CA050-10GC area scan cameras, line scan cameras, or digital single-lens reflex (DSLR) cameras.

In any embodiment the cameras can be fixed to the booth and thus the camera arrangement can take the shape of the inside of the booth. Alternatively, the cameras can be mounted on dedicated mounting structures.

Alternatively, rather than the cameras being mounted in fixed positions within the booth, one or more and in some cases all of the damage and/or appearance cameras can be mounted on one or more movable platforms, such as a mobile gangway or one or more robotic arms. In such embodiments, the user can drive the vehicle to a parking location and the movable platform(s) can move to move the cameras as they perform the damage detection and/or appearance capture. This can simplify the process from the user's perspective.

The booth can be provided with one or more visual or audible feedback devices such as monitor screens and/or speakers (not shown) coupled to the data processor to provide instructions and/or feedback to the user.

Thus, system 1 according to embodiments of the invention can be used by anyone with an appropriately sized vehicle 12. To enter the system 1 a user can simply drive towards the booth 2 where an ANPR camera U will read the license plate. If the user has created a profile prior to arrival at the system 1, the door EN can open automatically. If the user has not created a profile, they can be prompted to enter the vehicle mileage, service history, previous owners and contact details including email and phone number. Alternatively, a user can create a profile entering all the required information, which provides a platform to view their vehicle information after the image capture has been completed. A user can for example simply find the system website or download the systems app. On either platform, the user can be directed to create an account and register the vehicle 12 details. Once the information for the vehicle 12 has been registered, the entry door to the system can open. Vehicle information can alternatively be pre-registered by a vehicle fleet owner such as a car hire company. The user can then be directed to drive into the booth 1. As the user enters the system, they enter the damage assessment zone 10. This part of the system can be configured to analyse dents, scratches, underbody damage and the general external condition of the car using AI technology. Appearance images can also be captured in this zone 10. The user can then continue into the appearance assessment zone 50. Here, the user can stop the vehicle 12 at a staging point which can be indicated by the visual marker VM and optionally by large screens with display information for the user. The appearance images can be captured, the exit door can open, and the user can be directed to leave the booth 2.

Figure 6:
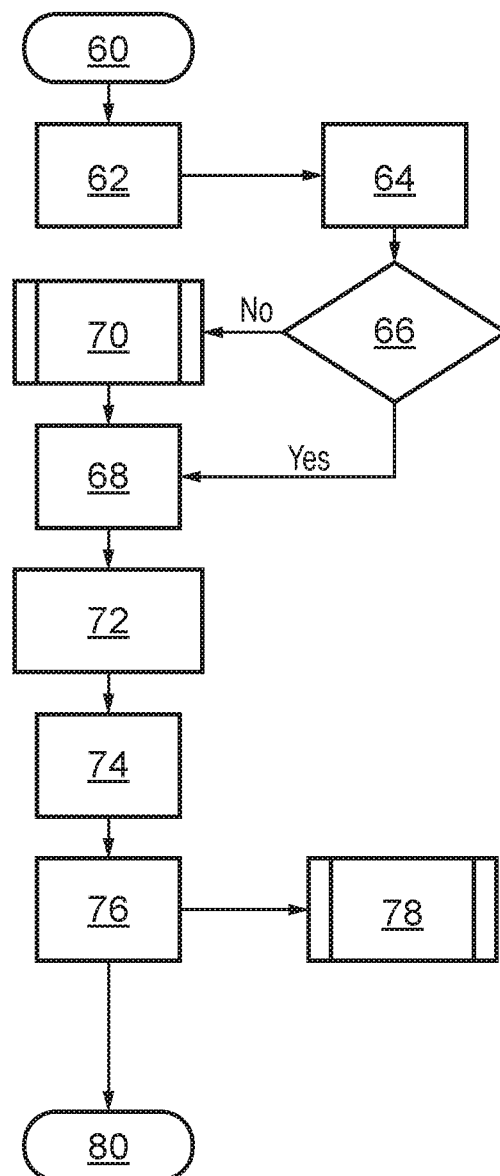
FIG. 6 is a flow chart illustrating a method of using the vehicle imaging station of FIG. 1.

Referring additionally to FIG. 6, a flow chart is shown illustrating a method according to an embodiment of the invention starts at 60.

At step 62 a user who is driving a vehicle 12 approaches the booth 2.

At step 64 the vehicle 12 approaching the booth 2 is identified, such as by the ANPR camera U.

At step 66 the system determines whether the user has registered details of the vehicle with the system.

If the user has registered details of the vehicle with the system, the method proceeds to step 68 and the entrance EN door opens to permit the vehicle 12 to enter the damage assessment zone 10. Once inside, the door can be closed.

If the user has not registered details of the vehicle with the system, the method proceeds instead to step 70 where the user is prompted to enter the vehicle mileage, service history, previous owners and contact details including email and phone number. This can be achieved by the user interacting with the system via a computing device positioned outside the booth, or using the user's mobile device such as a smart phone having installed on it an app that enables communication with the data processor over the wireless data link.

At step 72 the vehicle 12 is imaged by the damage assessment cameras. For example, the vehicle 12 is driven along the pathway 14 and passes through the structured light portion 24 of the tunnel volume whilst the dent detecting cameras 24 image the striped lighting reflected by the vehicle 12. As the vehicle 12 continues to travel through the tunnel 2A the same portion that has just been assessed for dents will pass through the non-structured light portion 32 of the tunnel volume. The non-structured light 32 is provided by the non-reflecting, non-illuminating surface 36 scattering the structured light 24. The non-structured light 32 can serve as the light source for the scratch detecting cameras 30. The vehicle 12 continues to travel along the tunnel 2A, being imaged by the two camera types 26, 30 until the vehicle 12 reaches the exit 20 and outer surfaces of the vehicle 12 have been captured by both dent and scratch detecting cameras 26, 30.

At step 72 the method can also comprise capturing appearance images. For example, the vehicle continues along the pathway 14 and enters the appearance assessment zone 50. Upon detecting that the vehicle 12 is at the imaging location, the appearance assessment camera(s) image the vehicle 12.

At step 74 the data processor receives the damage assessment images and executes the damage assessment program to automatically identify and assess damage to the vehicle using the damage assessment images and generate an output quantifying the damage to the vehicle. The damage assessment program is described in more detail below with reference to FIG. 8.

The damage assessment program can for example use images from the dent cameras to locate a dent and determine its size and depth profile. Knowing the vehicle identity, this information can be used to determine whether the dent has extended into the vehicle volume sufficiently to interfere with components of the vehicle. Likewise, scratches on surfaces such as the windows, indicators or number plate that could affect their operational performance can be identified. Thus, the damage assessment program can quantify the vehicle damage in a vehicle damage report.

Each defect detected can have a weighting depending on, for example: the type of damage, the severity of the damage, the location of the damage and/or the size of the damage. The weighting of each defect can be used to quantify or inform the overall vehicle condition and rating. In one simple example, dent damage of any type or location can be attributed 3 points, any scratch damage to the body can be attributed 2 points and any wheel damage can be attributed 1 point. In this example, the output quantifying the damage to the vehicle would be a damage rating of 6/10.

In some embodiments the weighting of each defect can be calibrated with existing car data matrices such as valuation matrices. This rating in turn with vehicle data such as the vehicle brand, model, age, service history and mileage can be used to refine the damage quantification. For example, detection of a dent of a certain depth at a particular location on a first type of vehicle can be deemed to be more problematic than the same dent at the same location on another type of vehicle, when it is known that for the first vehicle the dent can affect an underlying component, whereas on the other type it would not be problematic. Likewise, the age and service history of a vehicle can serve as a further weighting as to likely impact of an instance of damage to the vehicle. In some embodiments, the rating in turn with the vehicle brand, model, age, service history and mileage will inform the indicative price of the car.

In some embodiments, the National Asset Management Agency auction grading can be applied, in which has five grades determined on a points system allocated by type and severity of damage. The grades are based on the external condition of a vehicle.

At step 76 the data processor transmits the vehicle damage report to the server 47 via the network interface 46.

A decision program running on the server 47 receives the damage report and transmits the damage report to the user device 49 at step 78. The damage report can inform the user that the vehicle 12 is unsafe to drive.

The method can then end at step 80.

The method can comprise only transmitting the damage report to the user if the quantified damage exceeds a threshold. The threshold can for example be detection of a dent which is more than a predetermined depth, such as 5 cm, which may indicate the presence of damage to an underlying component. In another example, the threshold can comprise identification of a linear scratch that extends more than a predetermined length, such as 10 cm, which may indicate that a vehicle has been significantly damaged and repaired by welding a portion of one vehicle to a portion of another vehicle. In another example, the threshold can comprise identification of any damage on the vehicle. If no damage is detected, the damage report can be sent regardless, informing the user that no damage has been detected.

If appearance images have been captured at step 72, step 74 can include processing the appearance images to produce an appearance assessment report, step 76 can include transmitting the appearance assessment report to the server 47 and step 78 can include transmitting the appearance assessment report to a third party such as a vehicle location service and/or the user. Thus, the data processor can receive the appearance images and execute an appearance assessment program to automatically create a vehicle appearance report, which can be transmitted to the one or more further entities 51, 53 via the server 47. The one or more further entities can for example comprise automatic vehicle recognition services, which study images of vehicles on the public highways and the like to locate a particular vehicle. Such services may employ template matching or AI based search methods which require visual vehicle data. The vehicle appearance report can increase the likelihood of such a service being able to quickly and accurately identify the location of a damaged vehicle, enabling measures to be employed to reduce the likelihood a user of the vehicle being injured.

Figure 7:
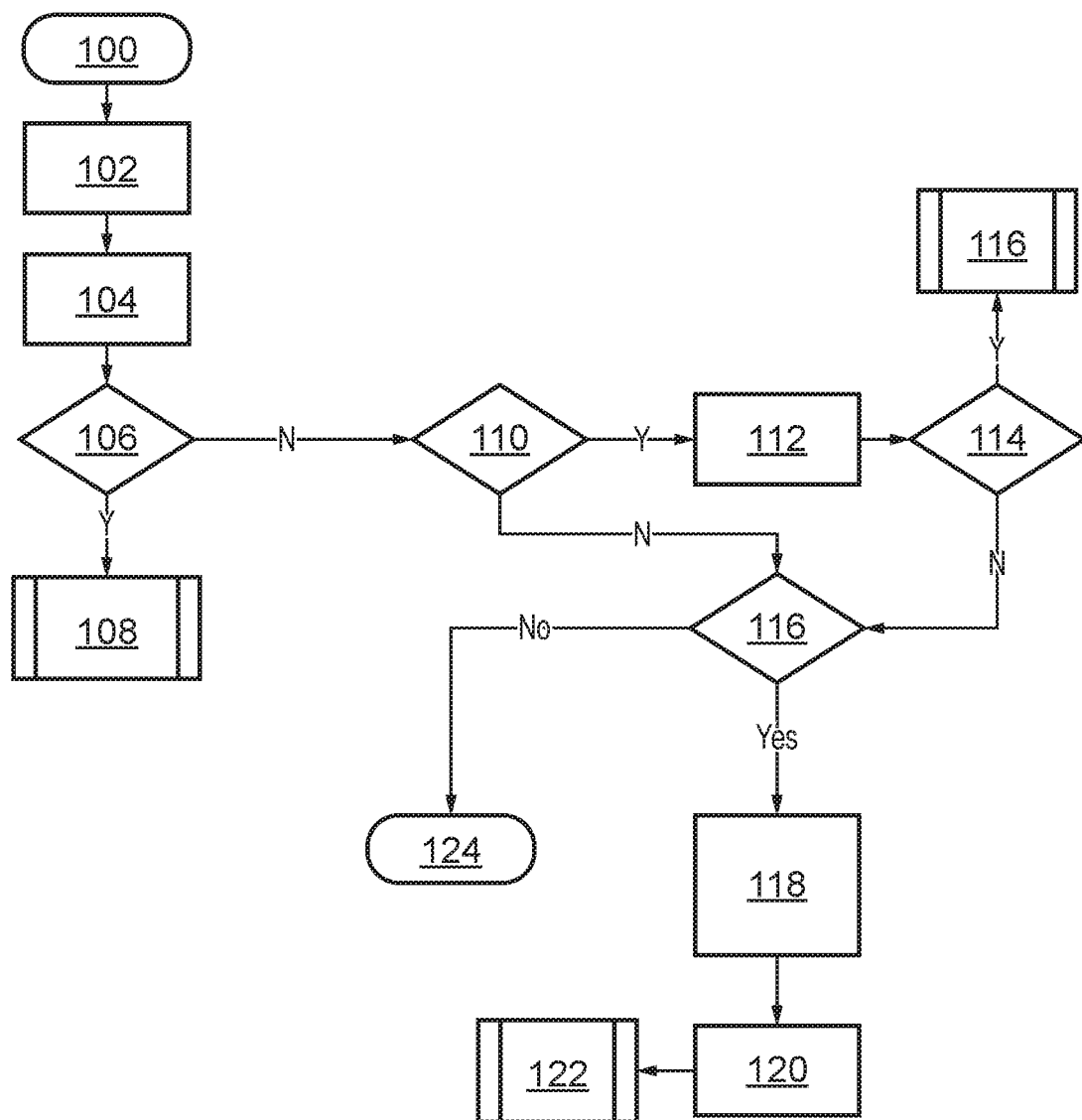
FIG. 7 is a flow chart illustrating a method of using the vehicle imaging station of FIG. 1.

Referring now to FIG. 7, the embodiments of the invention extend to a method of valuing selling a vehicle.

The method begins at step 100. Step 100 follows the method of FIG. 6.

At step 102 the user can log onto a driver page to view vehicle information.

At step 104, the user receives the damage report. The damage report can inform the user of a value of the vehicle 12 based on the damage report and optionally vehicle value data acquirable using the vehicle identifier. In the case of the latter, the vehicle information can be obtained from the DVLA in the UK. Globally, it can be pulled from an online database if present. If a database is not present, then a user can be required to enter details. The server can for example execute a valuation program that grades the vehicle. The valuation can for example be based on publically available valuation services such as WeBuyAnyCar. The damage can then be analysed from the vehicle inspection. Vehicle damage can for example be graded 1-10 based on the severity of external damage, 1 being little or no damage and 10 being significant. The grading would then deduct a percentage of value from the vehicle. This final estimated valuation would then be provided to the dealers as a starting point for bids to be made.

At step 106 the system 1 makes an offer to purchase the vehicle from the user for a price that is based on the valuation. Thus, the user can receive a text and/or email with an automatic valuation and option to sell the vehicle at this price. The text or email can include a link to accept the offer.

If the user selected the accept link, then at step 108 they will be directed to the automatic buyer's profile/website where they can follow the buyer's instructions and complete the sale of the vehicle.

The text or email can also include a decline link informing the driver they have the option to not accept this price and to open their vehicle up to other buyers, such as trade sale or online vendors/advertisers.

If the user selects the decline link, then at step 110 the system asks the user if they wish to open the sale up to traders.

If the user selects yes, at step 112 they will be directed to the systems website or app. Here they can either log in to their profile or create a profile and import the information from their image capture. They will then be asked to pay a relatively small first fee to link their vehicle information with local buyers, likely to be vehicle dealers. Dealers will receive the full profile of the vehicle including the valuation information of the vehicle and all the marketing shots. This will allow the trade dealers to bid an accurate bid and will be less likely to result in deductions later in the sale.

At step 114 a trader can make an offer for the vehicle. Once one or more bids on the vehicle have been offered the driver can choose the bid best suited to them. The trade dealers will be informed of the sale. They will then pay through the systems website/app. Once the payment has been completed the buyer and seller will have their information shared with one another to complete the sale. This will give drivers payment protection and safety in a potentially intimidating sales process. The trade dealers will be charged a percentage of the total sales price for the use of the system.

If the user accepts a trade bid then the sale is completed at step 116.

If a bid is not accepted at step 114 or the user declines to sell to traders at step 110, the method progresses to step 116 where an offer is made to the user to list the vehicle on an online vendor for a relatively large second fee. Here the driver will have their driver profile uploaded to an online vendor, displaying professional marketing images and all the appropriate information.

If the user selects yes at step 116, at step 118 they pay the second fee and the vehicle images, information and valuation can be provided to the online vendor site.

At step 120 the user will be required to download the system app or upload more data to the website. On the app they will be directed through a sales procedure including capturing interior images using an automated tour such as 'open driver door, move camera up/down or move camera to point at steering wheel etc.' to guide the user to take appropriate images, and other tasks to promote the sale of the vehicle. The system will link to 3rd parties using API's to advertise the vehicle automatically with minimal effort from the driver, most likely resulting in sale of the vehicle to another user at step 122.

If the user selects no at step 116, the method ends at step 124.

Thus, in some embodiments the one or more further entities 51, 53 can be entities to whom the user could sell the vehicle 12.

For example, the entity 51 can comprise one or more vehicle selling companies such as garages, which are relatively sophisticated and looking to sell the vehicle on to the public. The entity 52 can comprise one or more private sale platforms, via which the user can enter into peer to peer discussions concerning the sale of the vehicle.

In such embodiments, the damage report issued at step 68 can comprise an offer to purchase the vehicle from the user for the damage based valuation figure.

If the user is not satisfied with the price, the user can decline and proceed to drive the vehicle from damage assessment zone 10 to the appearance assessment zone 50 for the system to produce the appearance report at step 72 which can be sent to the entity 51. Any interested party from entity 51 can make an offer for the vehicle to the user via the server 47.

If the user is not satisfied with the price(s) offered by parties of entity 51 then the user can instruct the system via the server 47 to modify the appearance report to place the report in a more appropriate form for parties of entity 53; for example, including more detailed description concerning the vehicle.

In any embodiment the data processor 42 can execute a program to perform colour matching to adjust camera settings for vehicle colour. Colour matching can comprise sampling the vehicle colour either in the tunnel or outside via a camera. The image is then processed to determine the colour of the vehicle. Depending on the colour of the vehicle, all of the cameras inside the tunnel can be optimised in terms of colour contrast and brightness for imaging a vehicle of the colour. For example, if a white vehicle is being imaged by the system, a relatively large amount of structured light is reflected; however, for a black vehicle, a relatively small amount of structured light is reflected meaning that the images appears to be darker. The imaging station can therefore adjust the camera settings to allow for such variations in colour.

Figure 8:
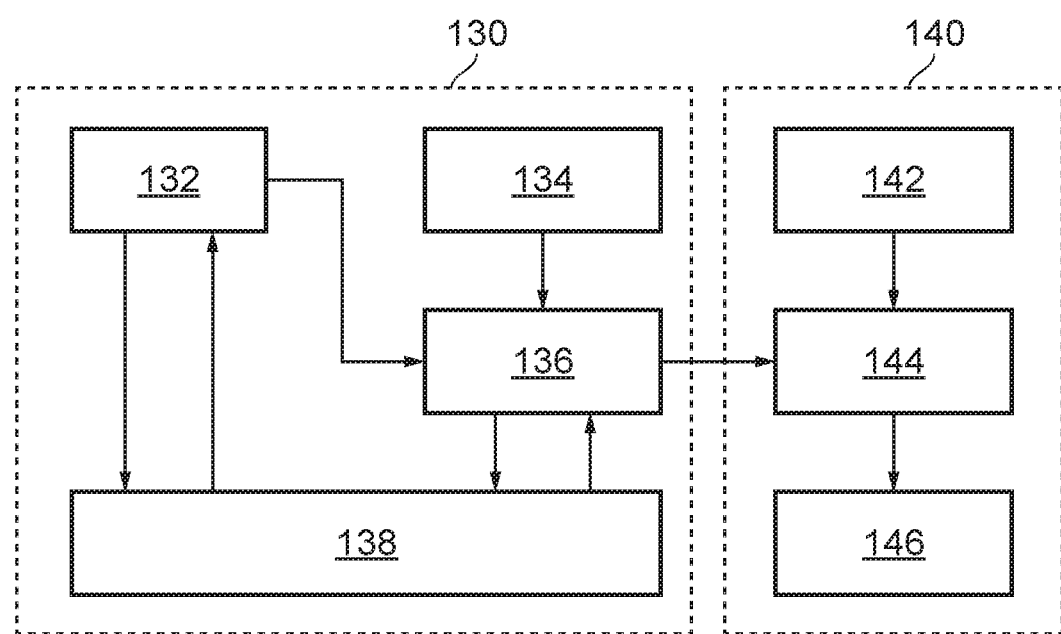
FIG. 8 is a diagram illustrating the AI training and implementation phases for the damage assessment program of the vehicle imaging station of FIG. 1.

Referring now to FIG. 8, a system diagram is shown illustrating the AI training phase 130 and deployment phase 140 for systems according to embodiments of the invention, such as system 1.

The training phase 130 comprises a data and pre-processing module 132, an AI algorithm module 134, a training algorithm module 136 and an underlying architecture/platform on which the training phase 130 is carried out.

At the data and pre-processing module 132, training images of damaged vehicles are provided to illustrate what the system will be seeking to identify and quantify. For example, images which have visible and labelled scratches and/or dents are provided. For each type of damage, the severity can be labelled such that the AI can infer both a type of damage and its severity. The training data can also label regions of vehicles to train the AI on where an instance of damage is located.

The AI algorithm module 134 can comprise a known algorithm such as a convolution neural network (CNN), support vector machine (SVM) or the like.

The training algorithm module 136 applies the training data 132 to the AI algorithm 143. If the AI algorithm is CNN based or the like then the training algorithm can comprise back propagation with stochastic gradient decent. If the AI algorithm is SVM based then the training algorithm can comprise the use of known methods such as quadratic programming.

The AI training platform can comprise any suitable conventional computing device, for example comprising one or more CPUs, and can be implemented as a distributed network of commuting devices.

The deployment phase 140 forms an integral part of the vehicle imaging station 1 and comprises a new data module 142, a model module 144 and a predictions module 146.

The model module 144 comprise the trained algorithm that was output from the training algorithm module 136 and is executed on the data processor 42, but can alternatively be executed by a data processor on the server 47 for example.

The model module 144 receives as inputs the damage assessment images from new data module 142. Thus, the trained model is a program executable to identify and assess damage to the vehicle using the damage assessment images.

The model module 144 outputs predictions 146 comprising one or more of: instances and types of damage; severity of the damage; and location(s) of the damage. Thus, the trained model generates an output quantifying the damage to the vehicle.

In one example, a damage, dent and defect multi-task CNN assess the vehicle condition using machine learning datasets to provide a probability of damage, damage class and damage size. The multi-task CNN can operate locally on data processor associated with the booth and also in cloud based computing, such as on the server. The multi-task CNN can continue to expand and learn using the images captured in the system. In one example, the trained neural network can be augmented using new data. Alternatively, the model can be updated by retraining the entire model, in some cases using the already trained model as a starting point i.e. rather than starting with a completely random configuration of network weights, the pre-trained weights are used as a starting point.

Although the invention has been described above with reference to one or more preferred embodiments, it will be appreciated that various changes or modifications can be made without departing from the scope of the invention as defined in the appended claims. Embodiments of the invention extend to an arrangement having fewer than four scratch detecting cameras, for example a single forward and rear facing camera, and the patterned portion does not need to be between the non-patterned portions. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A vehicle damage detection system comprising:
a booth having a booth entrance for a vehicle to enter the booth and a booth exit for the vehicle to exit the booth;
one or more damage assessment cameras orientated to capture damage assessment images of the vehicle when the vehicle is located at a damage assessment zone within the booth;
a data processor configured to:
receive the damage assessment images;
execute a program to identify and assess damage to the vehicle using the damage assessment images; and
generate a damage report quantifying the damage to the vehicle, wherein the one or more damage assessment cameras comprise:
a first field of view in which a structured light image will be reflected from a structured light source located within the booth to be visible to at least one of the one or more damage assessment cameras by a vehicle moving along a vehicle pathway, such that the first field of view can enable detection of dents on the vehicle; and
a second field of view in which a non-structured light image will be reflected to be visible to a single camera when a vehicle moves along the vehicle pathway, the non-structured light image comprising a reflection of part of the booth that is distinct from the structured light source such that the second field of view can enable detection of scratches on the vehicle.

2. The vehicle damage detection system according to claim 1, comprising one or more appearance assessment cameras orientated to capture appearance images of the vehicle when the vehicle is located at an appearance assessment zone within the booth.

3. The vehicle damage detection system according to claim 2, wherein the appearance assessment zone comprises a housing portion of the booth that has a larger volume than the tunnel portion.

4. The vehicle damage detection system according to claim 3, wherein one end of the tunnel portion opens into the housing portion.

5. The vehicle damage detection system according to claim 3, wherein the appearance assessment zone comprises a turntable sized to receive the vehicle and a motor unit configured to cause relative rotation between the turntable and a distinct portion of the appearance assessment zone and at least one of the appearance assessment cameras is mounted to face the rotational axis of the turntable.

6. The vehicle damage detection system according to claim 3, wherein the housing portion comprises a plurality of appearance assessment cameras disposed in an equiangular arrangement around a camera axis located within the housing portion.

7. The vehicle damage detection system according to claim 3, comprising a vehicle identification sensor such as an ANPR Camera positioned to capture vehicle data enabling the vehicle to be identified as it approaches the booth entrance.

8. The vehicle damage detection system according to claim 1, wherein a plurality of appearance assessment cameras is located within the tunnel portion and positioned to capture images of the wheels of the vehicle.

9. A vehicle damage detection system comprising:
a booth having a booth entrance for a vehicle to enter the booth and a booth exit for the vehicle to exit the booth;
one or more damage assessment cameras orientated to capture damage assessment images of the vehicle when the vehicle is located at a damage assessment zone within the booth;
a data processor configured to:
receive the damage assessment images;
execute a program to identify and assess damage to the vehicle using the damage assessment images; and
generate a damage report quantifying the damage to the vehicle, wherein the damage assessment zone comprises:
a tunnel portion of the booth having a tunnel entrance and a tunnel exit with one or more walls defining an enclosure between the tunnel entrance and tunnel exit to define a tunnel volume containing a vehicle pathway having a central axis;
a structured light source arranged to direct structured light at the vehicle pathway for illuminating a vehicle on the pathway with a structured light image;
a first damage assessment camera arranged with a first field of view comprising a structured light portion of the tunnel volume in which the structured light image will be reflected to be visible to the first damage assessment camera by a vehicle moving along the vehicle pathway;
a second damage assessment camera arranged with a second field of view comprising a non-structured light portion of the tunnel volume in which the structured light image will not be reflected to be visible to the second damage assessment camera when a vehicle moves along the vehicle pathway; and
a non-reflective, non-illuminating surface within the tunnel portion on a same side of the central axis of the vehicle pathway as the second damage assessment camera.

10. The vehicle damage detection system according to claim 9, comprising one or more appearance assessment cameras orientated to capture appearance images of the vehicle when the vehicle is located at an appearance assessment zone within the booth.

11. A computer controlled method of imaging a vehicle, the method comprising:
identifying a vehicle;
capturing damage assessment images of the vehicle;
at a computing device, processing the damage assessment images to identify and assess damage to the vehicle using the damage assessment images and produce a damage report quantifying the damage to the vehicle;
transmitting the damage report to a user, wherein the damage report comprises a first offer to purchase the vehicle for a first value from a first entity;
capturing image appearances of the vehicle;
at the computing device, processing the appearance images to produce an assessment damage report; and
transmitting the assessment damage report to one or more entities distinct from the user.

12. The method according to claim 11, further comprising transmitting the appearance report to a second entity in response to receiving a decline signal from the user with respect to the first offer.

13. The method according to claim 12, further comprising, in response to receiving a second offer to purchase the vehicle for a second value from a second entity, transmitting the second offer to the user.

14. The method according to claim 13, further comprising modifying and transmitting the appearance report to a third entity in response to receiving a decline signal from the user with respect to the second offer.

15. The method according to claim 14, further comprising, in response to receiving a third offer to purchase the vehicle for a third value from a third entity, transmitting the third offer to the user.

* * * * *